March 18, 1952 — O. E. STELZER — 2,589,517
MOUNTING FOR GLASS PANELS
Filed March 22, 1950
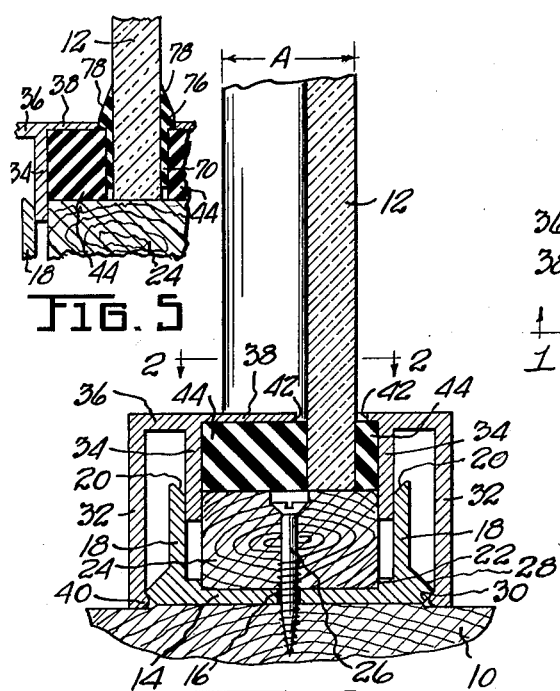
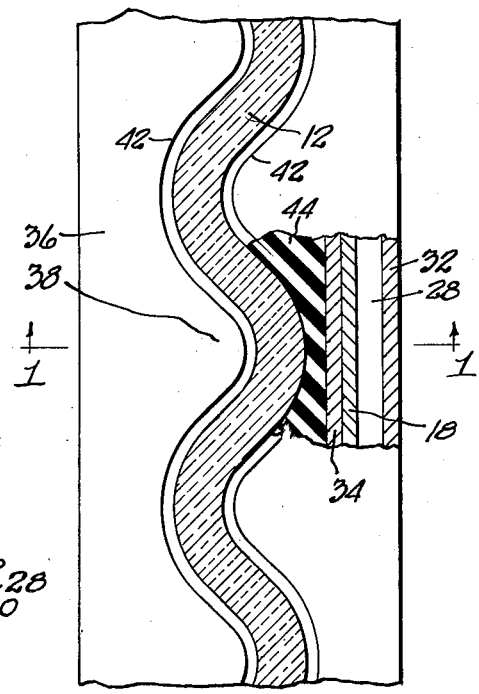
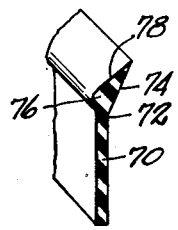
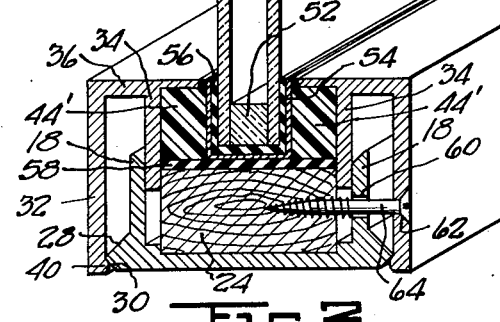
INVENTOR.
OTTO E. STELZER.
BY
ATTORNEYS Patented Mar. 18, 1952

2,589,517

UNITED STATES PATENT OFFICE 2,589,517

MOUNTING FOR GLASS PANELS

Otto E. Stelzer, German Township,
St. Joseph County, Ind.

Application March 22, 1950, Serial No. 151,120

2 Claims. (Cl. 189—78)

This invention relates to improvements in mountings for glass panels, and more particularly to a member by means of which a structural glass panel used to form a partition or a window may be mounted and supported.

The primary object of the invention is to provide a novel, simple and inexpensive construction for mounting a glass panel, which can be readily assembled with minimum requirement for the use of tools and which serves to support the glass panel firmly yet yieldingly, so that danger of breakage of the glass during installation, or when subjected to impact after installation, is minimized.

A further object is to provide a mounting of this character wherein the use of screws, clamps and similar securing members is reduced to a minimum and whose constituent parts so interlock or latch when applied together that they effect a self-latching action.

A further object is to provide a mounting member formed of a plurality of parts adapted to interlock and some of which are provided with compressible or yielding glass-engaging parts, which unit is so constructed that the assembly of the parts is effected by a swinging or tilting motion of the parts bearing the compressible material toward the glass so that frictional rubbing of the compressible material upon the glass occurs only during a slight terminal portion of the movement of the parts to effect an interlock, thereby simplifying the assembly of the parts, reducing resistance to disassembly, and avoiding damage to or displacement of the compressible material incident to assembly.

Other objects will be apparent from the following specification.

In the drawing:

Fig. 1 is a vertical sectional view taken on line 1—1 of Fig. 2 and illustrating a construction wherein the unit is adapted to mount a corrugated structural glass panel.

Fig. 2 is a sectional view taken on line 2—2 of Fig. 1 with parts broken away.

Fig. 3 is a perspective view illustrating the construction adapted for mounting flat structural glass panel, such as a double paned structural unit, wherein the margins of the glass panels are continuously joined by an hermetical sealing member holding the panels spaced apart.

Fig. 4 is a perspective view of a strip of rubber used in a modified embodiment of the invention.

Fig. 5 is a fragmentary view similar to Fig. 1, illustrating the use of the rubber strip shown in Fig. 4.

Referring to the drawing, and particularly to Figs. 1 and 2 thereof which illustrate one embodiment of the invention, the numeral 10 designates the structural member to which the glass mounting unit is to be secured, that structural member constituting a floor member, a ceiling member or any structural member, such as a member outlining an opening in the wall of a building which is to be spanned by a glass panel, such as a window, and particularly a display window for a store front. In the embodiment of the invention illustrated in Figs. 1 and 2 which is intended primarily for mounting a corrugated structural glass panel 12, the panels are usually applied in place with the corrugations thereof extending vertically. The provision of means to mount and seal such panels at their vertical edges, which are straight, is comparatively simple and easily accomplished. The mounting of the other edges, normally positioned horizontally as explained above, necessitates accommodation for the sinuous shape of the glass corrugations. The construction shown in Fig. 1 is particularly suited for such purpose.

The mounting member includes a backing member which is adapted to be secured fixedly to the support 10. This member is generally in the nature of a channel formed of metal and having a base panel 14 whose bottom surface is adapted to bear in flat face engagement with the support 10 and which is provided at its center along its length with a plurality of apertures 16. The channel includes side walls 18 of rigid character extending full length thereof and preferably tapered or inclined inwardly and upwardly at their upper edges at 20. The side walls 18 of the channel preferably are parallel to each other and perpendicular to the base 18 and cooperate with said base to define a rigid channel of a length extending for the full length of the opening in which the glass panel is to be mounted. The inner faces of the channel walls 18 are spaced apart a distance substantially greater than the dimension A of the corrugated glass, as illustrated in Fig. 1, that dimension being the maximum lateral displacement of the outer surfaces of the glass at the oppositely facing corrugations thereof. Stated differently, the corrugated glass being of sinuous or wavy form, as best seen in Fig. 2, has alternate oppositely facing convex surface portions and the dimension A is the greatest dimension of lateral displacement between the oppositely facing alternate convex surfaces.

The upper surface of the base panel 14 of the channel is preferably recessed for the major portion of its width, said recess being defined by shoulders 22 at each side thereof which are spaced inwardly from the flanges 18 preferably a distance substantially equal to or slightly greater than the thickness of the flange or wall 18. The recess thus defines a channel, and within this channel is positioned a rigid anchor strip or bar 24 preferably formed of wood, although it may be formed of any other rigid structural material found suitable. The bar 24 will be of a width to fit snugly within the groove, that is, a width substantially equal to the space between opposed shoulders 22 in the bottom wall 14 of the channel. The height or depth of the bar 24 is preferably substantially equal to the height of the channel walls 18, as best seen in Fig. 1, wherein the upper surface of the bar 24 is seen to lie in a plane at a level intersecting the bevels 20 at the upper edges of the walls 18. The bars 24 are provided with spaced apertures registering and aligned with the apertures 16 in the base wall 14, which apertures are preferably countersunk at their upper ends and which receive the screws or other securing members 26 by means of which the channel is secured fixedly to the supporting surface 10. The spaces between the bar 24 and the channel parts 18 constitute longitudinal grooves of which the parts 18 constitute the outer side walls.

The channel 14, 18 is preferably formed of metal, such as an aluminum alloy, which metal preferably will be non-corrosive and light in weight. The formation of the channel from such metal is not critical, however, as it may be formed from any other material possessing substantial structural strength. Thus it may be formed from plastic material, wood or the like. The channel is further characterized by the formation continuously along the length thereof at the outer surfaces of the side walls 18 of enlargements, beads or ridges. These ribs are preferably defined by an inclined upper surface 28 and an inclined lower surface 30, angularly related one to the other, with the apex thereof spaced substantially from the outer surface of the wall 18 and of uniform cross-sectional dimension throughout its length. As illustrated, the surfaces 28 and 30 are positioned substantially at right angles to each other and inclined relative to the vertical, and the rib defined therebetween is uniform in shape and dimension throughout its entire length.

A pair of retainer members cooperate with and are supported by the channel member 14, 18 to bear against the opposite surfaces of the glass panel 12. As illustrated herein these members are substantially of the same construction. Each defines an inverted rigid channel and an inwardly projecting flange, and constitutes a rigid and unitary member preferably formed of metal although it may be formed of any other rigid material of required strength. Each channel includes an outer wall 32, an inner wall 34, a top panel or cross-wall 36 and a flange 38 forming substantially a continuation of the cross-wall 36 and projecting inwardly with reference to the inner wall 34. The outer wall 32 is of a height substantially greater than the height of the channel wall 18, so that when its inner or lower edge bears against the support 10, as illustrated, with the wall 32 substantially parallel to the wall 18, the cross-wall 36 will be positioned in outwardly spaced relation to the outer edge of the channel wall 18 as shown. The inner wall 34 will be of substantially shorter length, and that length will preferably be such that said wall 34 in the operative position of the parts shown in Fig. 1 extends only slightly below the level of the lowermost part of the beveled top face 20 of the flange 18, the dimension preferably being less than one-fourth of an inch. The inwardly facing or confronting surfaces of the parts 32 and 34 are preferably spaced apart a distance substantially equal to the spacing between the plane of the inner surface of the wall 18 and the apex or ridge of the rib defined by the surface 28, 30 of the channel 14, 18. At the inner surface of its free or marginal portion, the wall 32 has a bead, rib or thickened portion 40. The width of this bead 40 is preferably substantially equal to the spacing of the apex of the rib defined by the surfaces 28, 30 of the channel from the bottom surface 14 of said channel. As illustrated, the bead or rib may be of transversely curved contour or it may be of any other shape desired, and it usually extends full length of the retainer.

The flange or cross-wall part 38 has its inner edge 42 shaped in scalloped, wavy or undulated form, as best seen in Fig. 2, which shape substantially corresponds to the shape of the adjacent surface of the glass 12 but which is spaced slightly from said glass in the operative arrangement of the parts, as illustrated in Figs. 1 and 2 so that there is no contact of said flange 38 with the glass panel 12.

A filler 44, preferably formed of sponge or foam rubber, a soft solid natural rubber, a synthetic rubber or any other yielding material, such as a felt pad or body or a solid material having a surface coating of rubber or other compressible material or a body of calking material, is carried by each of the retainers with one surface thereof bearing against the wall 34, and another surface thereof bearing against the inner surface of the flange 38. I prefer to use a highly compressible and resilient material, such as sponge or foam rubber, for this purpose in the member 44. The member 44 is of such thickness that, when the parts are in operative relation, the bottom surface thereof will bear against the bar 24, the normal thickness of said member 44 being preferably slightly greater than the spacing between the flange 38 and the confronting surface of the bar 24 in the arrangement of the parts which is illustrated in Fig. 1, so that said member 44 will be slightly compressed when in the position illustrated in Fig. 1. The inner edge of the member 44 is contoured to corrugated, undulating or wavelike form, projecting inwardly beyond the edge 42 of the flange and adapted for full face engagement with the panel throughout its length and throughout the corrugations thereof, as illustrated in Figs. 1 and 2. The parts are so arranged and constructed, and the thickness of the members 44 carried by the opposite retainers is such, that there will probably be a slight inward compression laterally of the members 44 when the retainers are anchored in place, thus providing a firm frictional grip of the glass panel 12 between the pads or pressure strips 44. The compressible strip 44 extends continuously for the full length of the retainer and of the glass strip engaged thereby, and is confined in the cavity defined by parts 24, 34, 38 and 12 at each side of panel 12.

In the use of the device, the channels 14, 18 for mounting opposed margins of the glass, for example, the upper and lower margins, are secured in place in proper position by means of the securing members or screws 26. As here illustrated, the heads of these screws or securing members should preferably be countersunk below or inwardly or clear of the face of the bar 24. The panel 12 is then applied to place between the opposed bars 24 for which purpose said glass panel is made of a size to pass into or between the channel walls 18 in the event said walls are of greater height or thickness than the bars 24. The glass panel will bear upon the lowermost bar 24, although it will be understood that a sheet of protective material, such as cloth, felt, sheet rubber, or the like, may be applied to cover the exposed surface of the bar 24, particularly the lowermost bar, in a manner comparable to that illustrated in Fig. 3. The glass panel is held in proper position, and one of the retainers at one side of the channel is applied in place, being held by the insertion of the free margin of the wall 34 between the channel wall 18 and the block or bar 24 and further being held in that position by the engagement of the head 40 with the surface 30 of the base channel. The arrangement of the parts is such that they will hold themselves together but a combined sliding and tilting movement fulcrumed at the point of engagement of the inner margin of the member 44 with the bar 24 will easily disengage or release the parts. In other words, the parts are so constructed that when the main channel is held inverted and one of the retainers is anchored thereto, the retainer will hold itself in place but permit, by slight manual manipulation, the quick and easy release of the parts. It will be understood, of course, that when the first retainer has been anchored to the channel, the glass panel will be adjusted as to its position to bear against the scalloped or inner edge of the cushion member 44.

Thereupon, the other retainer member is applied to place. The parts are so constructed that, in the application of the second retainer, the bottom or inner edge of the flange or wall 34 will bear against the tapered edge 20 of the channel wall 18, and the bottom of the bead 40 will bear against the surface 28 of the projection of the rib of the body channel when the rubber or resilient member 44 first bears against the glass, the parts assuming positions wherein the walls 32 and 34 of the retainer will be tilted upwardly and outwardly relative to the adjacent channel wall 18. The positioning of the parts in this manner is accomplished easily and quickly. Thereupon, pressure is applied in a downward direction against the top of the retainer; that is, pressure is applied downwardly against the parts 36 and 38, and this downward pressure acts to cause the movement of the retainer to the same interlocked position that is occupied by its companion. This movement toward locked position has components of movement both toward the glass and downwardly and is somewhat of a rocking or inwardly tilting movement. The movement is fulcrumed by the engagement of the wall 34 with the channel wall 18 and is guided by the engagement of the bead 40 with the surface 30 of the bead of the main or body channel. When the parts are so arranged, a firm frictional grip is exerted upon the opposite faces of the glass by the rubber pads, and this firm frictional grip, coupled with the interfitting engagement of the parts, that is, the interengagement of parts 18 and 34 and the snap lock of interlocking rib parts 30 and 40, serves to lock both retainers automatically against accidental separation. In other words, after this interlock has been effected, the mounting cannot be disassembled except by the exercise of substantial force and effort, for example, by prying upon the bottom edge of one of the retainer walls 32 to pry it away from the support 10. It will be observed, of course, that the parts are so constructed that the edge of the retainer wall 32 will substantially bear against the support 10 when the parts are in proper position, there being avoided any noticeable clearance at this point in order to reduce the likelihood of accidental disengagement of the parts through a prying action.

The channel and retainer parts are all formed of substantially rigid construction. Thus, when formed of aluminum alloy, the thickness of the parts 14, 18, 32, 34 and 36 will all be in the order of approximately one-eighth of an inch. This thickness insures sufficient strength and rigidity, and yet at the same time, a slight amount of resilience so as to permit the snap action of the parts to their interlocked position. The dimensions cited are, of course, illustrative and are not intended to be limiting, as they may vary with the usage intended and with other factors, such as the nature of the material of which they are formed. It will be observed that this rigidity, coupled with the continuous extension of the retainer members the full length of the glass, make each of the retainer members a long unit and further serve to resist separation of the parts. Thus, when it is attempted to pry at any one point, the rigidity of the entire retainer and its continuous embracing of rigid anchor portion 18, 28, 30 of the backing member, and its interlock along its length at the rib parts 30, 40 immediately adjacent to the point at which the prying operation occurs are such that the retainer is held against flexing so that in units of any substantial length it is usually necessary to pry upon the same at several points in order to disengage the parts.

It will be apparent that the construction provides a built-up channel assembly of such character that there is not applied to the glass panel at any time any force which is detrimental to the glass. The avoidance of direct contact of the metal with the glass insures against direct impacts. Consequently, any pressure which is applied against the glass is taken up in part, or at least to some measure, by the compressible member 44. This, in addition to protecting the panel against impact, insures against any application of torque in an amount which would excessively stress the glass panel or subject it to the possibility of breakage incident to vibration, to contact, or to like impact.

Any suitable means may be employed to anchor the vertical margins of a glass panel, if desired. Such means may take conventional forms of channel structures or store front glass mounts. In cases where interior usage occurs, it may be unnecessary to bind or confine the vertical edges of the glass panels. It is also possible, where desired, to use at said vertical edges the same construction herein specified, in which event the flanges 38 and the resilient or compressible strips 44 will be formed with flat inner surfaces.

The device is particularly well suited for the mounting of double paned glass units of the type now commonly sold upon the market for store windows or the like, and which have, as illustrated in Fig. 3, two spaced panels 50 arranged in parallel relation and held spaced apart and with the space therebetween sealed continuously at the margins of the panes by sealing strips 52. Various constructions of such material are now common on the market. In some instances the spacer strips 52 extending along the margins are cemented or bonded to the inner surfaces of the glass panels, and such bond serves as the sole means for anchoring the panels 50 together. Another construction which is now commercially available utilizes a metal channel 54 extending around and receiving the marginal portions of the assembled panels, which channels may be provided with a liner 56 interposed between the same and the surfaces of the glass. Such double glazed units are very fragile and their efficacy depends upon continued maintenance of the seal for the air space between the panels. Consequently, such units cannot be subjected to any torque in mounting, and it has been very difficult and time-consuming and expensive to mount them in store windows and other installations for which they are intended.

My improved mounting serves this purpose very effectively, as illustrated in Fig. 3. The parts of Fig. 3 bear the same reference numerals as similar parts in Figs. 1 and 2 where such parts are similar. There is illustrated in Fig. 3 a sheet 58 which may be formed of rubber, sponge rubber, or other compressible or yielding material, such as felt or fabric, which member 58 covers the surface of the bar 24, so that the edge of the double paned glass had contact with a yielding material. It will be understood, however, that the use of such a pad, while preferred, is not essential, its benefit residing in a slight reduction in the amount of care which must be utilized in handling the glass panel. The inner edge 38' of the flange 38 of each retainer is straight, as seen, and in the assembly of the parts is spaced outwardly from the double paned glass unit. It is preferred in this construction to use a non-hardening, waterproof calking material 44' as the filler material which is pressed by the retainers into engagement with the opposite faces of the glass panel, particularly at that side of the glass panel which is to be exposed to the weather in use. Usually the glass will be mounted completely in such calking material, although it will be understood that calking material may be used at one surface of the glass, and a yielding material, such as rubber or a sponge rubber, may be used at the other surface, or any other combination found suitable may be utilized.

The assembly of the parts occurs in the same manner above described, it being apparent, however, that where calking material is utilized, the operation effecting the interlock of the parts will be such that, in order to insure a full filling of the receiving cavity by the calking material, some excess of said material may be provided which will be extruded through the space between the inner edge 38' of the flange 38 and the adjacent outer surface of the glass panel unit during assembly of the parts. This extruded flash material will, of course, be trimmed or removed, if desired.

Because of its use for store front purposes in the exterior of a building, it may be desired to supplement the self-locking character of the device by a positive mechanical lock, and such an arrangement is possible, as is illustrated in Fig. 3, by providing one or more of the walls 18 with openings 60 and by providing aligned and preferably countersunk openings 62 in the outer wall 32, which openings 60 and 62 are adapted to receive a screw, bolt or other securing member 64, here illustrated as a wood screw extending clear of the edge of the wall 34 of the retainer and entering into and interlocking or anchoring in the bar 24.

This construction possesses all of the advantages mentioned above, is assembled in the same way, and fully satisfies the requirements of mounts for glass panels spanning openings in the outer wall of a building. It may be mentioned further that, while the construction of Fig. 3 has been referred to herein in connection with its application for mounting a double paned glass panel, it is equally effective for use in mounting single thickness glass plates or panels.

In some instances it may be desired to provide against the possibility of the collection of moisture interiorly of the retainer and at the same time to retain the advantages of sponge rubber which is characteristically porous, and hence subject to the absorption of moisture if exposed thereto. A construction which will serve these purposes is illustrated in Figs. 4 and 5. The construction entails the cementing or anchoring to the compressible or sponge strip 44 of a soft solid rubber strip. This strip preferably will be substantially flat and of uniform thickness for the major portion 70 of its width and through a width substantially equal to the depth of strip 44 or at least that part of the strip 44 which it engages. In its normal shape, the strip 70 is provided at one face thereof with a longitudinally extending bend 72 which separates a substantially flat surface portion 74 from the surface of the part 70, said surface portion 74 preferably being disposed at an angle to the surfaces of the body portion 70, as illustrated. The body is thickened or outwardly bulged at 76 adjacent to the bend 72 at the side thereof opposite said bend, and from this bulge or bend is tapered along the face 78 to substantially a feather edge junction with the surface 74. The use of this construction is illustrated in Fig. 5, wherein it will be apparent that as the mounting for the glass panel is assembled, the strip 70—78 will be deflected from its normal position shown in Fig. 4 when it contacts the glass so as to insure a continuous face engagement of the surface 74 with the glass. The outward deflection or bending of this contoured part 74, 76, 78 of the strip causes the shoulder portion 76 to overlie part of the top surface of the rubber strip 44 adjacent thereto, and the portion 76 is preferably of such a thickness that it engages continuously the inner edge 42 of the flange 38, as illustrated in Fig. 5. The surfaces 78 tapering upwardly and inwardly from said shoulder provides a bevel as seen in Fig. 5. Consequently, for external construction it will be apparent that the flexing of the strip from its Fig. 4 position to the Fig. 5 position incident to assembly of the glass mounting will insure a continuous and slightly stressed contact of the upper portion defined by parts 74, 76, 78 so that moisture is prevented from passing between the strip and the glass pane. The moisture, instead, passes down the beveled edge 78 and onto the top of the flange 38 and 36 which, in this instance, may be somewhat inclined outwardly and downwardly from the position shown so as to provide the necessary drainage of water therefrom. This construction insures a complete water-tight joint, avoiding danger of destruction incident to entry of water into the construction and the freezing thereof in cold weather. At the same time it permits the soft yielding stress-avoiding mounting which is possible with sponge or foam rubber. The rubber strip 70—78 will preferably be formed of a rubber of approximately 30 durometers in hardness, although this measurement is cited as illustrative and it will be understood that rubber, either slightly harder or slightly softer, may be employed.

While the construction herein described has been referred to throughout as utilizing two retainer members having a snap lock or self-locking action upon a backing member, it will be understood that the use of two separable retainers is not necessary, particularly in cases where a flat glass panel or unit is to be mounted. Thus, for instance, the mounting unit at one side may have the wall 32 and the flanges 36 and 38 and associated parts formed integrally with the base panel 14 and providing therein, in association with the block 24 and a flange similar to the flange 34, a socket for receiving a resilient member or calking material. Only one separable retainer is necessary in such a construction, it being apparent that the same self-locking action will occur with such a two-part construction as has been described above with reference to the three-part construction. Thus, for instance, assuming that the two piece unit has the wall 32 integral with the base 14 positioned outermost in a store front assembly, and has its socket filled with a calking material, the glass is positioned to abut the calking material and the retainer at the inner face of the glass is snapped into place. The assembly at each margin of the glass is locked in the same manner and there is no possibility of access to the separable retainers from the exterior of the building.

While the preferred embodiments of the invention have been illustrated and described herein, it will be understood that changes in the construction may be made within the scope of the appended claims without departing from the spirit of the invention.

I claim:

1. A panel mount comprising an elongated, substantially rigid backing member adapted to be secured to a support and having a pair of spaced longitudinal grooves defined in part by outer side walls, a pair of elongated retainers each having a pair of spaced inner and outer walls and a cross-wall portion connecting said spaced walls and projecting laterally beyond said inner wall, said inner wall fitting in a groove of said backing member, said outer retainer wall and side backing wall each having a longitudinal interlock rib, the rib of said retainer being snapped over the rib of said backing member when said inner retainer wall is inserted in a groove of said backing member, said backing member and the inner and cross-walls of each retainer cooperating with a panel positioned between said retainers to define a pair of longitudinal cavities, and a filler in each cavity.

2. In combination, a panel, a rigid backing member adapted to be secured to a support, a pair of spaced retainer portions carried by said backing member and receiving a marginal portion of said panel therebetween, yielding fillers confined by said backing and retainer portions and engaging opposite faces of the marginal panel portion, at least one of said retainer portions being rigid and separable from said backing member, cooperating slidably engaging guide parts on said backing member and separable retainer portion, and cooperating interengaging snap lock parts carried by said backing member and separable retainer portion spaced from said guide parts, said filler maintaining said snap lock parts in locking engagement.

OTTO E. STELZER.

REFERENCES CITED

The following references are of record in the file of this patent:

UNITED STATES PATENTS

| Number | Name | Date |
|---|---|---|
| 689,228 | Roe | Dec. 17, 1901 |
| 1,000,094 | Klemm | Aug. 8, 1911 |
| 1,793,503 | Michaels | Feb. 24, 1931 |
| 2,099,751 | Plym | Nov. 23, 1937 |
| 2,220,569 | Himmel et al. | Nov. 5, 1940 |
| 2,342,352 | Lowry | Feb. 22, 1944 |

FOREIGN PATENTS

| Number | Country | Date |
|---|---|---|
| 18,577 | Australia | Feb. 25, 1929 |
| 47,461 | Netherlands | Dec. 15, 1939 |